United States Patent [19]
Heller et al.

[11] 4,166,339
[45] Sep. 4, 1979

[54] GREENHOUSE WITH HEATING AND VENTILATING MEANS

[76] Inventors: László Heller, 45 Bimbó ut; László Forgó, 14 Néphadsereg utca; István Papp, Ady Endre utca; János Bódas, 41 Fillér utca, all of Budapest, Hungary; Georgij S. Agejev, 38/81 Micsurinszkij proszpekt, Moscow, U.S.S.R.; Ivan A. Alekszejev, 45/10 Krasznoszelszkja, Moscow, U.S.S.R.; Ruben G. Minaszjan, 20/11 Szemasko u., Moscow, U.S.S.R.

[21] Appl. No.: 817,920

[22] Filed: Jul. 21, 1977

Related U.S. Application Data

[63] Continuation of Ser. No. 639,972, Dec. 11, 1975, abandoned.

[51] Int. Cl.² .............................................. A01G 9/00
[52] U.S. Cl. ................................................ 47/17
[58] Field of Search ................. 47/17, 19; 165/16, 20, 165/21

[56] References Cited

U.S. PATENT DOCUMENTS

| | | | |
|---|---|---|---|
| 764,003 | 7/1904 | Peck | 47/17 |
| 1,949,735 | 3/1934 | Bulkeley | 165/21 X |
| 2,063,711 | 12/1936 | Turner | 165/16 X |
| 2,374,208 | 4/1965 | Jones | 165/20 X |
| 3,470,943 | 10/1969 | Van Huisen | 47/19 X |
| 3,822,504 | 7/1974 | Kliehn et al. | 47/62 |

FOREIGN PATENT DOCUMENTS 714638  9/1954  United Kingdom ........................ 47/17

Primary Examiner—Edgar S. Burr
Assistant Examiner—James R. Feyrer
Attorney, Agent, or Firm—Young & Thompson

[57] ABSTRACT

The heating means of a greenhouse is combined with a source of waste heat. Preferably, the heating means is a surface heat exchanger placed in the flow path of air which is circulated in the greenhouse while the waste heat source is a mixing condenser of a steam turbine power plant. The condensate from the mixing condenser is cooled down in the surface heat exchanger which warms up the air in the greenhouse. If it has water spray means associated with it which is operated dependent on the moisture content of circulating air, cooling of the condensate and warming up as well as moistening of circulated air is effected by the same system at the expense of waste heat.

1 Claim, 3 Drawing Figures

GREENHOUSE WITH HEATING AND VENTILATING MEANS

This is a continuation of application Ser. No. 639,972, filed Dec. 11, 1975, now abandoned.

This invention concerns greenhouses having means for heating and ventilating.

Greenhouses heated by radiators are already known. The radiators are traversed by water at a temperature of 130 to 95 degrees centigrade, the water being warmed up in a boiler pertaining to the greenhouse proper. Greenhouses heated by calorifers are known as well in which the calorifers are operated with natural gas or by electricity.

High consumption of fuel and electricity, respectively, is a deficiency common to greenhouses. A further drawback consists in that, in summer time, the air in the greenhouse warms up because passages in the walls of the greenhouse offer but restricted possibilities for natural ventilation. If, on the other hand, greenhouses are ventilated by intense change of air, heat losses increase considerably.

In order to obviate the aforesaid defficiencies it has been suggested to maintain a prescribed air temperature by means of a layer of water which is circulated on the roof of the greenhouse. However, the roof will soon be covered by seaweed and algae whereupon desired temperatures and moisture contents necessary for the plants in the greenhouse cannot be guaranteed any more. On the other hand, in winter time, heat consumption increases and such increase has to be covered again by high grade sources of heat. As is known, in case of heat or atomic power plants more than half of the generated heat withdraws unexploited into the ambiency or surrounding space. Consequently, life conditions of the environmental systems in natural waters deteriorate while physical processes in the atmosphere undergo a change. Moreover, heating of greenhouses requires combustion of millions of tons of high grade fuels.

The main object of the present invention is to avoid the above described deficiencies.

The invention aims at the provision of a greenhouse with means for heating and ventilating with which a prescribed temperature and a desired moisture content of the air within the greenhouse is warranted by making use of a source of heat of relatively low potential. The basic idea of the invention consists in that heating of the greenhouse can be accomplished by surface heat exchangers which are operated by a source of waste heat. Heating of the greenhouse is obtained by air warmed up by contact with the surface heat exchangers which, in turn, provide for cooling down a medium which carries the waste heat. In such manner, in addition to an economic heating of a greenhouse, also the effects of disadvantageous environmental conditions may generally be avoided.

Thus, the invention is concerned with a greenhouse equipped with means for heating and ventilating which comprises, in compliance with the main feature of the invention and in combination, a casing, an air passage in said casing, a surface heat exchanger in said air passage, a waste heat source connectable to said surface heat exchanger, and means for circulating air in said air passage through said surface heat exchanger. Preferably, the waste heat source will be a mixing condenser, e.g. the mixing condenser of a steam turbine power plant. This permits, in addition to the heating of the greenhouse by means of the surface heat exchanger, also the cooling down of the condensate from the mixing condenser so that, in addition to environmental advantages, also economic points of view are widely considered.

Hereinafter, the invention will be described by taking reference to the accompanying drawing which shows, by way of example, two embodiments of the greenhouse according to the invention and in which.

Same reference characters in the drawing refer to similar details.

Figure 1:
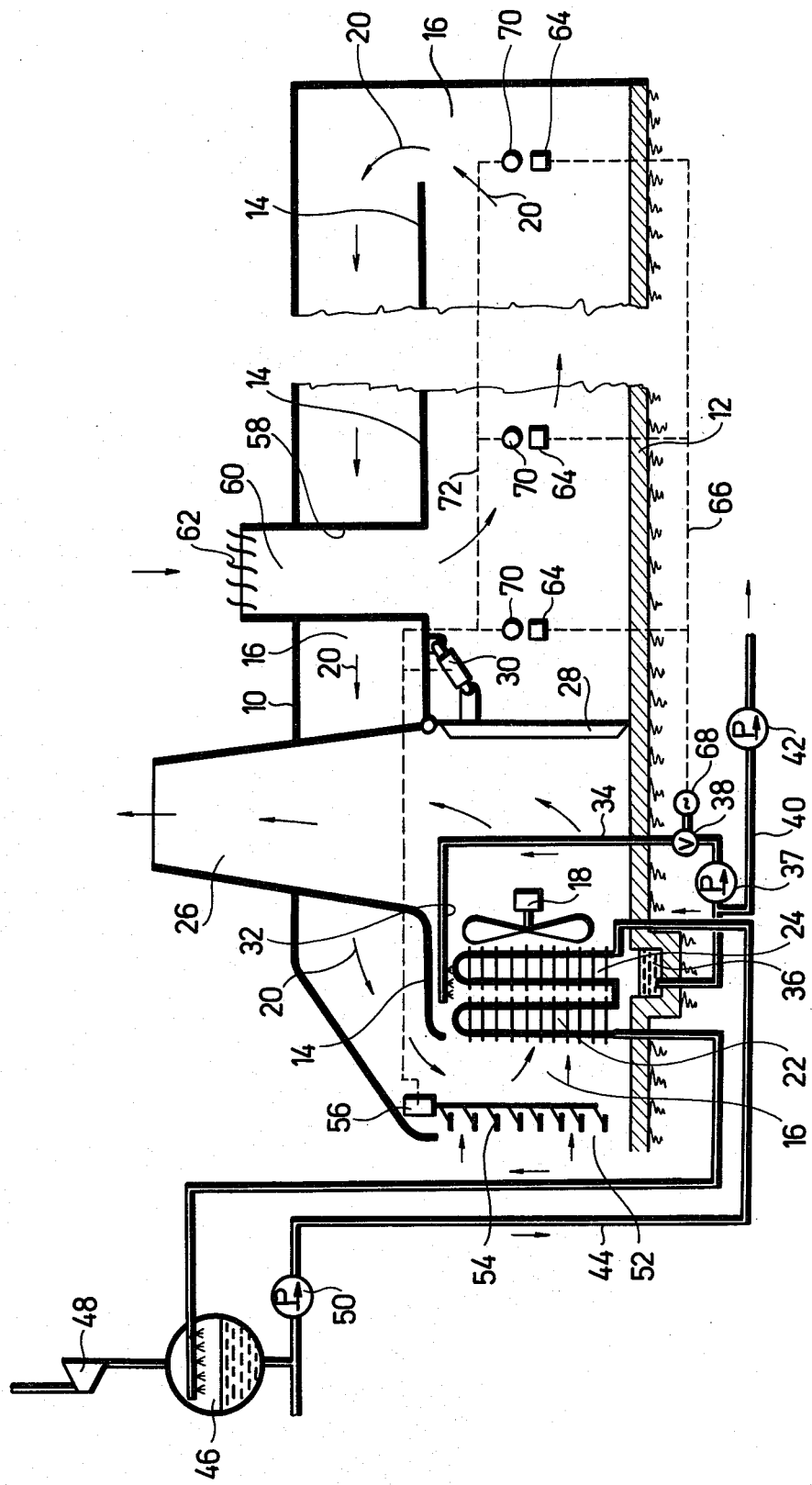
FIGS. 1 and 2 show connection diagrams of one embodiment in two operational positions.

In the drawing, reference numeral 10 designates a greenhouse and reference character 12 the soil on which it stands. Within the greenhouse 10 an air channel 16 is formed by means of a partition 14. The air channel 16 extends across the whole length of the greenhouse 10. In the lower part of the air channel 16 there is a ventilator 18 which maintains an air flow therein. The air flow proper and its flow direction are indicated by arrows 20. With the represented embodiment, two surface heat exchangers 22 and 24 are arranged one behind the other in the direction of the air circulating in the air channel 16.

Downstream the surface heat exchangers 22 and 24 the air channel 16 has a chimney 26 of adjustable inlet area connected to it. The inlet area of the chimney 26 is adjusted by a control means which consists of a sluice 28 and its drive 30. Furthermore, with the represented embodiment, a return section of the air channel 16 which supplies the air to the surface heat exchangers 20 and 24 is arranged along the roof of the greenhouse 10. Such arrangement permits to reduce heat losses in the greenhouse 10 and the circulated amount of air. Viz., the upper or return section of the air channel 16 is separated from the operating or lower section thereof so that the temperature prevailing in the upper air channel section may be lower than the temperature in the section therebelow. Thereby, the flowing air is relatively more cooled down so that less amounts of air have to be circulated in order to introduce certain amounts of heat into the greenhouse 10. Moreover, heat losses diminish as well since the air flowing in the upper section of the air channel 16 is relatively colder so that the temperature difference which determins the heat loss between the interior of the greenhouse and the ambiency may likewise be smaller.

One of the two surface heat exchangers 22 and 24 and more particularly, in the instant case, the surface heat exchanger 24 is complemented with surface wetting spray means 32 connected to a water conduit 34 and serving for wetting the surface of the surface heat exchanger 24. The water conduit 34 opens into a basin 36 located beneath the surface heat exchanger 24 with its surface wetting spray means 32, the water of the basin 36 being conveyed by a pump to the surface wetting spray means 32. The water conduit 34 has, in the form of a valve 38, a closure means provided in it which permits to control the amount of water which is used or necessary for wetting the surface of the surface heat exchanger 24.

A watering plant of the greenhouse is connected by means of a water conduit 40, connected likewise to the basin 36. The water of the watering plant is delivered through the water conduit 40 by means of a pump 42.

The surface heat exchangers 22 and 24 are connected with a waste heat source through a conduit 44. With the represented embodiment, the waste heat source consists of a mixing condenser 46 which is e.g. associated with a steam turbine power plant with a steam turbine 48. The condensate is delivered from the mixing condenser 46 by a pump 50 through the conduit 44.

In the instant case, air may be introduced into the greenhouse 10 at two places. One place is an air inlet 52 which lies upstream the surface heat exchanger 22 and the free cross-sectional flow area of which is controlled by a louver 54. The louver 54 is operated by a servo unit 56. The other place of air introduction is a chimney 58 with an air inlet 60. The chimney 58 penetrates the upper or return section of the air channel 16. The cross-sectional flow area of the chimney 58 can be adjusted by a louver 62.

Furthermore, with the represented embodiment, sensors 64 are provided in the air channel 16 which serve to ascertain the moisture content of the air circulated in the greenhouse 10. The moisture sensors 64 operate a servo unit 68 of the valve 38.

Moreover, in case of the illustrated embodiment, the greenhouse 10 is provided with heat sensors 70 as well which serve for ascertaining the temperature of circulated air. The heat sensors 70 are connected by means of a servo conduit 72 with the drive 30 of the sluice 28 and with the servo unit 56 of the louver 54, respectively.

In operation, the condensate from the mixing condenser 46 of the steam turbine 48 is delivered by the pump 50 into the series connected surface heat exchangers 22 and 24 which transmit the heat of the condensate to the interior of the greenhouse 10. Heat transmission will be intensified by the ventilator 18 which keeps the air within the greenhouse 10 in a constant circulation in the direction of the arrows 20. Thus, the air sweeps the surface heat exchangers 22 and 24 and absorbs their heat which will now be conveyed into the operational portion of the greenhouse 10. The cooled down condensate is returned to the mixing condenser 46 via the conduit 44.

In summer time, the greenhouse 10 has to be constantly ventilated. For such purpose, the sluice 28 occupies its closed position shown in FIG. 1 so that the air introduced through the air inlet 52 and the air inlet 60 withdraws through the chimney 26 into the ambiency after having absorbed the heat of the surface heat exchangers 22 and 24. The air introduced through the air inlet 60 flows in the direction of the arrows 20 along the greenhouse 10 whereby a thorough ventilation of the interior thereof is obtained.

Where the operating portion of the greenhouse 10 requires heating, the louver 62 will be closed. On the other hand, the heat sensors 70 set the drive 30 in operation which, in turn, opens the sluice 28. One portion of the air coming from the surface heat exchangers 22 and 24 flows now also to the operating portion of the greenhouse 10 and increases its temperature there.

Upon diminishing of the moisture contents of the air in the operating portion of the greenhouse 10 below the value adjusted by the moisture content sensor 64 the servo unit 68 of the valve 38 is set into motion and the valve 38 opened. Then, the pump 37 delivers water from the basin 36 via the water conduit 34 to the surface wetting device 32 wherefrom the water is sprayed down onto the surface of the surface heat exchanger 24 which becomes wet thereby. Consequently, the moisture content of the air sweeping the surface heat exchanger 24 is increasing until the value adjusted by the moisture content sensor 64 is obtained.

With increasing temperature and moisture content, respectively, adjustment or control takes place in a direction opposite to the above described movements.

It will be apparent that the greenhouse according to the invention meets relatively most advantageous economic and environmental conditions: independent of the heat requirement of the greenhouse, the condensate is efficiently cooled while the amount of heat required for heating the greenhouse is obtained entirely from waste heat. By means of wetting the surface of the surface heat exchanger in addition to a more efficient cooling of the condensate also a suitable moisture content of the air in the greenhouse will be obtained.

Figure 2:
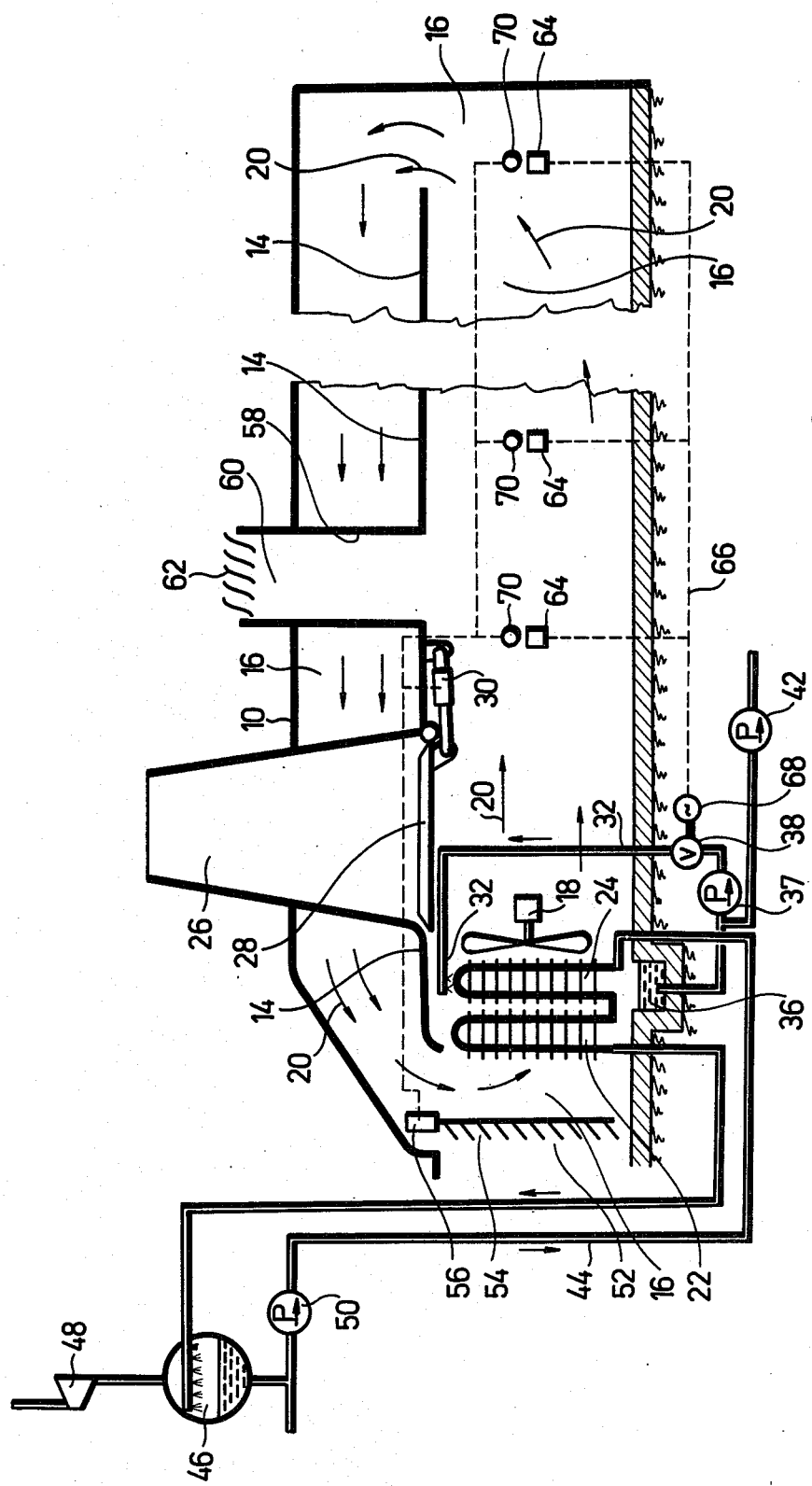

In winter time, the louver 54 in the air inlet 52 and the louver 62 in the air inlet 60 will be closed and the sluice 28 of the chimney 26 adjusted into a horizontal position. Hereby, the interior of the greenhouse 10 is separated from the ambiency. Such position is illustrated in FIG. 2. It will be seen that the air is now circulated within the casing 10 in the air channel 16. Control of its temperature and moisture content is, otherwise, effected in the same manner as in summer time operation where the interior of the greenhouse was partly or entirely connected with the ambiency.

Figure 3:
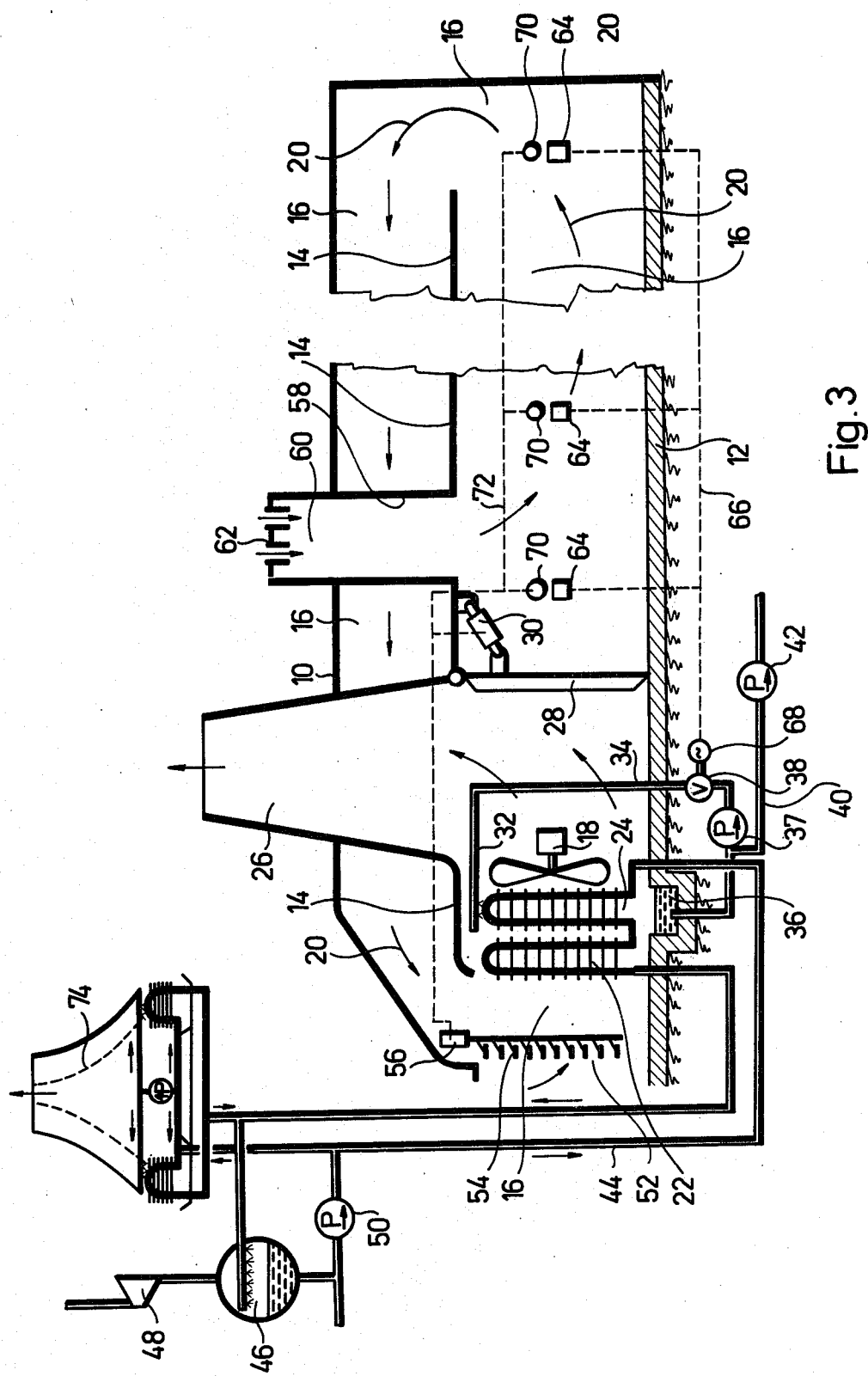
FIG. 3 represents a connection diagram of the other exemplified embodiment.

The exemplified embodiment shown in FIG. 3 differs from the previous one in that the heat of the condensate from the mixing condenser 46 will be extracted partly by means of a cooling tower 74. The latter is connected in parallel to the heating plant of the greenhouse and, more particularly with the represented embodiment to the surface heat exchangers 22 and 24 and to the conduit 44, respectively. The cooling tower 74 may be of any type. FIG. 3 represents a combined cooling tower with a combination of wet and dry cooling means.

It will be apparent that, on the one hand, a combination of a cooling tower parallelly connected to the cooling water cycle of a mixing condenser of a steam turbine and, on the other hand, of a heating plant of a greenhouse as suggested by the invention permits, within the limits of the amount of waste heat at disposal, to couple a steam turbine with a greenhouse of optional capacity and, consequently, of optional heat requirements.

What we claim is:

1. A greenhouse in combination with a steam turbine plant comprising, in combination, a casing, an air passage in said casing, a surface heat exchanger in said air passage, means for spraying water over said heat exchanger, a basin beneath said heat exchanger for collecting water falling from said heat exchanger, means for returning water from said basin to said spray means, a waste heat source consisting of a mixing condenser of said steam turbine plant which supplies hot liquid condensate to said heat exchanger to heat said heat exchanger, means for returning to said mixing condenser said condensate cooled in said heat exchanger and for using said cooled condensate to condense steam from said steam turbine plant in said mixing condenser, means for circulating air in said passage through said surface heat exchanger, a partition dividing said air passage in said casing into upper and lower air passage portions in which air passes through said casing in opposite directions, a first air inlet upstream of said heat exchanger for admitting air into said lower air passage portion, a chimney downstream of said heat exchanger for discharging air from said air passage and thereby from said greenhouse, a second air inlet farther downstream of said heat exchanger than said chimney for admitting air into said lower air passage portion, a sluice mounted for swinging movement in said lower air passage between one position in which said sluice blocks said lower air passage portion between said chimney and said second air inlet and establishes communication between said chimney and said heat exchanger, and another position in which said sluice establishes communication between said heat exchanger and said second air inlet along said lower air passage portion and interrupts communication between said heat exchanger and said chimney, and means responsive to the temperature in said lower air passage portion to swing said sluice between said positions.

* * * * *